United States Patent [19]
Le Marchand et al.

[11] 3,942,612
[45] Mar. 9, 1976

[54] FRICTION PAD MOUNTING MEANS FOR A DISC BRAKE CALIPER

[75] Inventors: Claude Le Marchand, Domont; Pierre Courbot, Villiers-le-Bel, both of France

[73] Assignee: Societe Anonyme D.B.A., Paris, France

[22] Filed: Apr. 11, 1975

[21] Appl. No.: 567,222

[30] Foreign Application Priority Data
Apr. 25, 1974  France............................ 74.14391

[52] U.S. Cl. ............................................ 188/73.6
[51] Int. Cl.² ........................................ F16D 65/12
[58] Field of Search ....... 188/73.1, 72.4, 73.3, 73.4, 188/73.5, 73.6

[56] References Cited
UNITED STATES PATENTS

| | | | |
|---|---|---|---|
| 3,392,808 | 7/1968 | Soltis, Jr. ........................... | 188/72.4 |
| 3,800,923 | 4/1974 | Rike................................... | 188/73.6 |
| 3,865,215 | 2/1975 | Burgdorf et al.................... | 188/73.6 |
| 3,880,261 | 4/1975 | Courbot............................. | 188/73.6 |

*Primary Examiner*—Trygve M. Blix
*Assistant Examiner*—Edward R. Kazenske
*Attorney, Agent, or Firm*—Ken C. Decker; William N. Antonis

[57] ABSTRACT

The invention relates to a disc brake in which the brake pads are slidably mounted in an anchoring member straddling the disc. The pads co-operate with V-ribs formed in the anchoring member beyond the periphery of the disc. Each rib has an axial surface parallel to the force generated during braking and a surface perpendicular to the resultant of the braking force and of the braking torque. The ribs are slotted to permit the pads to be extracted radially after the pistons have been retracted beyong their idle position.

4 Claims, 2 Drawing Figures

FRICTION PAD MOUNTING MEANS FOR A DISC BRAKE CALIPER

The present invention relates to a disc brake for a motor vehicle.

The invention relates more particularly to a disc brake comprising brake applying means associated with a carrying member, said brake applying means including at least one piston having an idle position and cooperating with at least one brake pad, said pad comprising a backing plate to which a friction lining is fixed, said backing plate having a given thickness and circumferentially spaced ends defining a maximum circumferential length, said carrying member being provided with a substantially rectangular aperture defining a pair of circumferentially spaced edges, said pad being slidable by way of its circumferentially spaced ends on two series of surfaces, each series of surfaces being formed on one of said edges and comprising a useful area with which is adapted to cooperate one of said ends whatever the wear of the lining.

In this kind of brakes, radial mounting and dismounting of the pads is often impossible in the presence of the rotary disc and requires at least partial dismounting of the carrying member.

In order to avoid this drawback, the present invention proposes a disc brake of the kind set forth and in which each edge of the aperture is further provided with at least one slot whose axial length is at least equal to the thickness of the backing plate and which is offset towards said piston relative to the corresponding usefull area of a given distance which is the same on each edge of the aperture, the corresponding slots in each edge of the aperture defining a circumferential length which is at least equal to said circumferential length of the backing plate, the piston being capable of moving away from the pad a distance from its idle position at least equal to said given distance.

In the particular embodiments in which the carrying member is a calliper axially slidable with respect to a fixed support member and carrying a second brake pad, said second pad comprising a second backing plate to which a second friction lining is fixed, said second backing plate having a given second thickness and circumferentially spaced second ends defining a second maximum circumferential length, said second pad being carried by way of its circumferentially spaced ends on said series of surfaces to define a rest position, the invention is characterized in that each edge of the aperture is provided with a second slot whose axial length is at least equal to the second thickness and which is offset towards said piston relative to said rest position of a second distance which is the same on each edge of the aperture, the corresponding second slots in each edge of the aperture defining a circumferential length which is at least equal to the circumferential length of the second backing plate.

A particular embodiment of the invention will now be described with reference to the accompanying drawings, in which.

Figure 1:
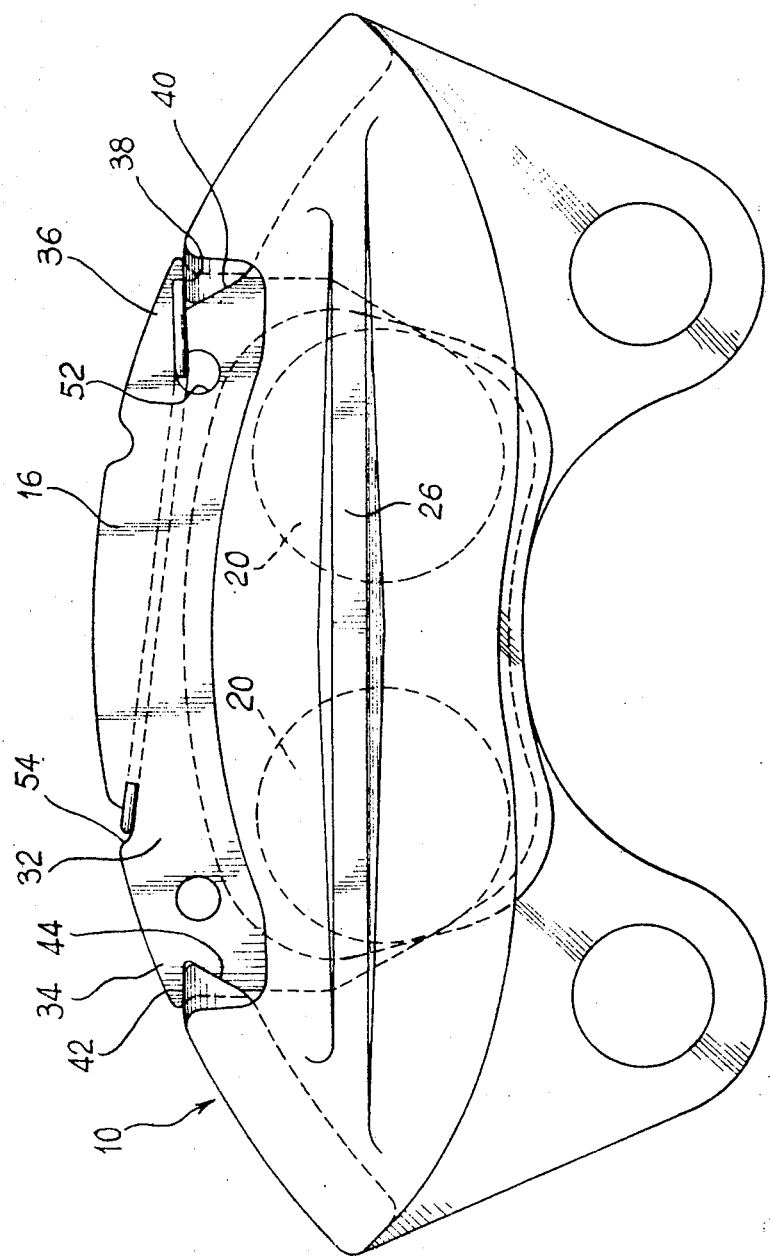
FIG. 1 is a transverse view of a disc brake embodying the invention.
Figure 2:
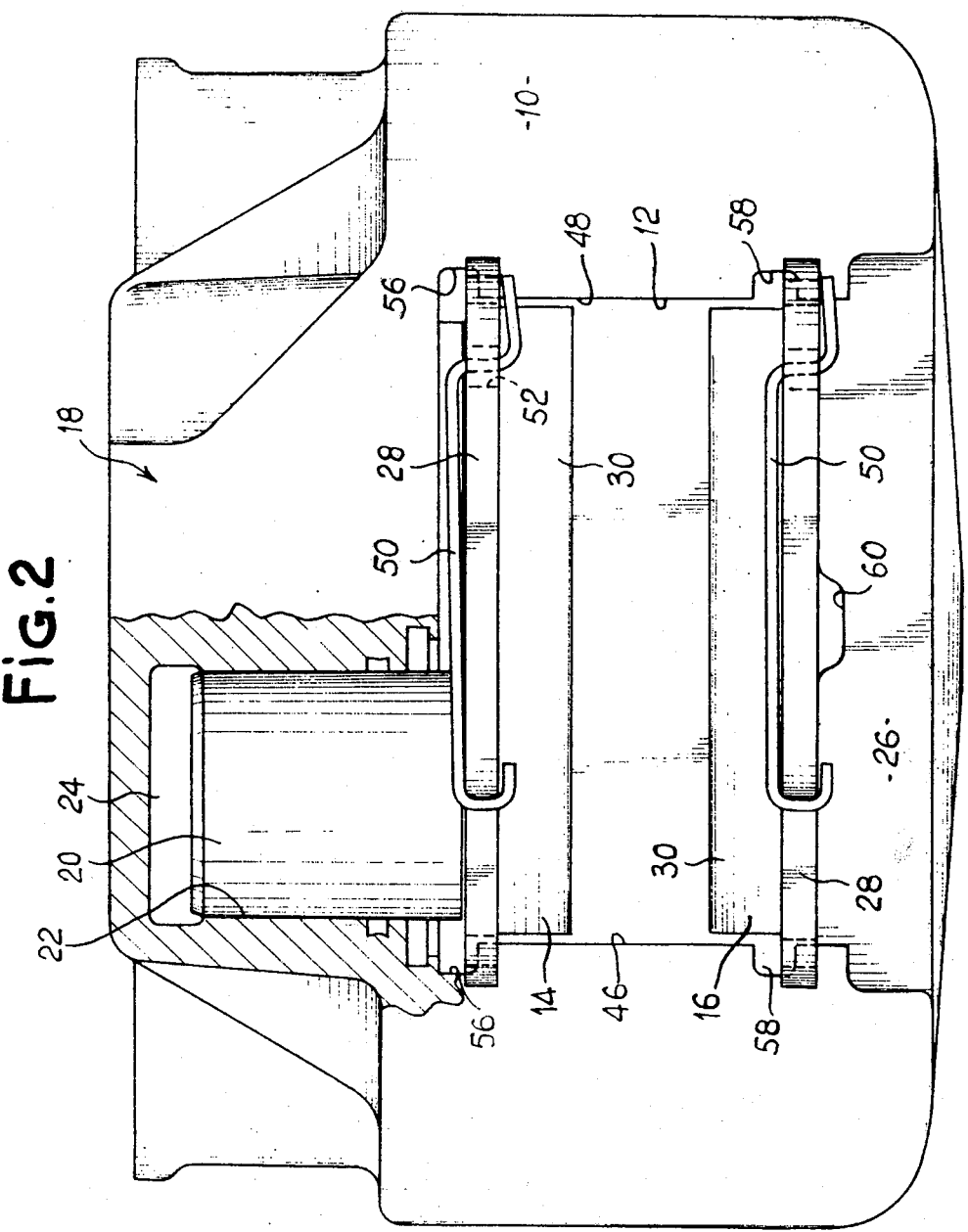
FIG. 2 is a plan view of the brake shown in FIG. 1.

In the disc brake illustrated in FIGS. 1 and 2, a carrying member generally designated 10 straddles a rotary disc (not shown) and comprises means for applying the brake pads 14, 16 to the corresponding faces of the disc.

By way of example, the embodiment described has brake applying means formed by a set of brake actuators generally designated 18, comprising two pistons 20 mounted in two cylinders 22 associated with the carrying member 10, which is a calliper, so as to define two actuating chambers 24 connectible to a pressure fluid source (not shown). The pistons 20 urge the pad 14 directly into frictional contact with the corresponding side of the disc, the calliper 10 being axially slidable on a fixed support (not shown) so that its reaction portion 26 can move the pad 16 into frictional contact with the other side of the disc.

Each pad is formed of a backing plate 28 to which a friction lining 30 is attached. As FIG. 1 shows, each backing plate 28 has an extension 32 extending radially outwards from the periphery of the disc. Each circumferential end 34, 36 of the extension 32 has two sliding and bracing edges 38, 40 which co-operate with corresponding surfaces 42, 44 on the calliper 10. The surfaces 42, 44 form two axial ribs 46, 48 in the axial edges of an aperture 12, provided in that part of the calliper 10 which straddles the disc.

A metal wire 50 forming a noise-reducing spring is interposed between each pad and the calliper 10. The wire 50 passes through a hole 52 and notch 54 in the associated pad extension 32, and bears on the surface 42 of the ribs 46 or 48.

The surfaces 42 of the ribs 46, 48 and the edges 38 of the ends 34, 36 of the pads are substantially parallel to the line of application of the tangential force generated during frictional contact between the brake linings and the disc in response to operation of the brake applying means. Similarly, the surfaces 44 of the ribs 46, 48 and the edges 40 of the pad ends 34, 36 define an angle other than zero with a plane perpendicular to the tangential force generated during braking. In order to minimize the dimensions of the brake, the tangent of this angle is substantially equal to the distance from the centre of the edges 44 of the ends 34, 36 to the line of application of the tangential force, in a plane parallel to the plane of the disc, divided by the distance separating the centres of the edges 42, 44 of the ends 34, 36 respectively, in a direction parallel to the line of application of the tangential force.

In the embodiment here described, the backing plate of the pad 14 adjoining the brake actuator 18 is capable of cooperating with portions of the ribs 46, 48, so that the pad can occupy the idle position illustrated in FIG. 2 and can move along the grooves towards the disc by a distance corresponding to the combined thickness of the linings 30 of the pads. Similarly, the backing plate of the pad 16 can normally co-operate with only portions of the ribs 46, 48 corresponding to the idle position shown in FIG. 2, which in this case is superimposed on the actuating position since the pad 16 is attached to the reaction portion 26 of the calliper 10.

Two slsots 56, 58, whose axial lengths at least equal the thickness of the backing plates of the pads 14, 16 respectively, are formed in each rib 46, 48. The slots 56 are offset axially relative to the portions of the ribs 46, 48 normally co-operating with the backing plate of the pad 14, whereas the slots 58 are offset axially relative to the portions of the ribs 46, 48 normally co-operating with the backing plate of the pad 16. This feature of the slots 56, 58 enables the pads 14, 16 to be extracted radially when the brake applying means have been released and when the calliper 10 has slid axially over the fixed support and each of the pads has slid axially along the ribs 46, 48 to bring the corresponding backing plates opposite the slots 56, 58 respectively. The distance separating the bottoms of opposite slots 56, 58 is at least equal to the distance separating the circumferential ends of the corresponding pads, to enable the latter to be introduced radially. However, it is slightly less than the distance separating the circumferential ends of the extensions 32, so that the pads are prevented from escaping inwards into the brake during installation.

To permit installation of the pad 14, the pistons 20 can move away from the disc by a distance at least equalling the distance by which the rib portions normally co-operating with the pad 14 are axially offset when idle with reference to the corresponding slots 56, relative to their normal idle position (shown in FIG. 2).

An aperture 60 is provided in the reaction portion 26 of the calliper so that the pad 16 can easily be disengaged and moved away from the caliper portion 26.

Installation of the pads is carried out as follows:

The calliper 10 is slid downwards in FIG. 2, and the pad 16 is introduced radially into the slots 58 and then slid along the ribs 46, 48 into the position shown in FIG. 2. The pistons 20 are then pushed right into the cylinders 22, and the calliper 10 is slid upwards in FIG. 2. The pad 14 is now introduced radially into the slots 56 and slid axially along the ribs 46, 48 into the position shown in FIG. 2. When the brake is first applied, the pistons 20 will, when idle, return to the position shown in FIG. 2, the noise-reducing springs 50 having previously been installed as shown in the drawings.

It should be noted that both the disc and the calliper remain in position throughout all these operations, and also the pad removal operations, which take place in the same manner but in the reverse order. Removal of the pad 16 is assisted by the provision of the aperture 60 in the calliper's reaction portion 26, since a tool can be inserted to form a lever and to bring the backing plate of the pad 16 opposite the slot 58.

Although the embodiment described by way of example relates to a disc brake of the sliding-calliper type, the invention can of course be applied equally well to a disc brake of the fixed type, in which case both pads are installed in the same way as the pad 14 associated with the slots 56 in the embodiment described.

What is claimed is:

1. A disc brake comprising brake applying means associated with a carrying member, said brake applying means including at least one piston having an idle position and cooperating with at least one brake pad, said pad comprising a backing plate to which a friction lining is fixed, said backing plate having a given thickness and circumferentially spaced ends defining a maximum circumferential length, said carrying member being provided with a substantially rectangular aperture defining a pair of circumferentially spaced edges, said pad being slidable by way of its circumferentially spaced ends on two series of surfaces, each series of surfaces being formed on one of said edges and comprising a usefull area with which is adapted to cooperate one of said ends whatever the wear of the lining, wherein each edge of the aperture is further provided with at least one slot whose axial length is at least equal to the thickness of the backing plate and which is offset towards said piston relative to the corresponding usefull area of a given distance which is the same on each edge of the aperture, the corresponding slots in each edge of the aperture defining a circumferential length which is at least equal to said circumferential length of the backing plate, the piston being capable of moving away from the pad a distance from its idle position at least equal to said given distance.

2. A disc brake according to claim 1, wherein each series of surfaces comprises two surfaces defining a V-shaped key portion on the corresponding edge of the aperture, said V-shaped key portion cooperating with a V-shaped groove formed on the corresponding end of said pad.

3. A disc brake according to claim 2, said carrying member being a calliper axially slidable with respect to a fixed support member and carrying a second brake pad, said second pad comprising a second backing plate to which a second friction lining is fixed, said second backing plate having a given second thickness and circumferentially spaced second ends defining a second maximum circumferential length, said second pad being carried by way of its circumferentially spaced ends on said series of surfaces to define a rest position wherein each edge of the aperture is provided with a second slot whose axial length is at least equal to the second thickness and which is offset towards said piston relative to said rest position of a second distance which is the same on each edge of the aperture, the corresponding second slots in each edge of the aperture defining a circumferential length which is at least equal to the circumferential length of the second backing plate.

4. A disc brake according to claim 2, wherein the second pad is identical to the first pad.

* * * * *